US011463839B2

(12) United States Patent
Jadav et al.

(10) Patent No.: US 11,463,839 B2
(45) Date of Patent: Oct. 4, 2022

(54) COGNITIVE LOCATION AND NAVIGATION SERVICES FOR CUSTOM APPLICATIONS

(71) Applicant: International Business Machines Corporation, Armonk, NY (US)

(72) Inventors: Divyesh Jadav, San Jose, CA (US); Moitreyee Mukherjee-Roy, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/742,765

(22) Filed: Jan. 14, 2020

(65) Prior Publication Data

US 2020/0154235 A1    May 14, 2020

Related U.S. Application Data

(62) Division of application No. 16/127,106, filed on Sep. 10, 2018, now Pat. No. 10,652,693.

(51) Int. Cl.
*H04W 4/021*    (2018.01)
*H04W 4/02*    (2018.01)
(Continued)

(52) U.S. Cl.
CPC .......... *H04W 4/021* (2013.01); *G01C 21/206* (2013.01); *G06F 40/40* (2020.01); *G10L 15/005* (2013.01);
(Continued)

(58) Field of Classification Search
CPC ....... H04W 4/021; H04W 4/023; H04W 4/02; H04W 4/024; H04W 4/33; H04W 4/12;
(Continued)

(56) References Cited

U.S. PATENT DOCUMENTS 6,526,351 B2    2/2003  Whitham
6,754,484 B1    6/2004  Hiltunen et al.
(Continued)

FOREIGN PATENT DOCUMENTS

WO    2016174670 A1    11/2016

OTHER PUBLICATIONS

Bulut et al., "LineKing: Coffee Shop Wait-Time Monitoring Using Smartphones," IEEE Transactions on Mobile Computing, vol. 14, No. 10, Oct. 2015, pp. 2045-2058.
(Continued)

*Primary Examiner* — Jaime M Holliday
(74) *Attorney, Agent, or Firm* — Zilka-Kotab, P.C.

(57) ABSTRACT

According to various embodiments, systems, computer program products, and computer implemented methods for cognitive location and navigation services for custom applications are disclosed. More specifically, the cognitive location and navigation services include, but are not limited to cognitive navigational guidance through a tourist attraction. For instance, a method includes receiving a request for cognitive navigational assistance through a tourist attraction; obtaining site-specific information about the tourist attraction from a site-specific server; determining whether a user profile describing user viewing preferences exists; and either: directing the user to navigate through the tourist attraction according to a path based on the existing user profile; or recommending a first exhibit to visit based at least in part on crowding levels at the tourist attraction and recording user behavior observed while viewing the first exhibit. Corresponding systems and computer program products are also disclosed.

20 Claims, 6 Drawing Sheets

(51) Int. Cl.
*G10L 15/00* (2013.01)
*G01C 21/20* (2006.01)
*G06F 40/40* (2020.01)
*G06F 16/9535* (2019.01)
*G06F 9/451* (2018.01)

(52) U.S. Cl.
CPC ............ *H04W 4/023* (2013.01); *G06F 9/454* (2018.02); *G06F 16/9535* (2019.01); *H04W 4/02* (2013.01)

(58) Field of Classification Search
CPC .... H04W 4/029; G06F 40/40; G06F 16/9535; G06F 9/454; G10L 15/005; G01C 21/206; G01C 21/20; G01C 21/3629
See application file for complete search history.

(56) References Cited

U.S. PATENT DOCUMENTS

| | | | |
|---|---|---|---|
| 6,862,500 | B2 | 3/2005 | Tzamaloukas |
| 6,868,256 | B2 | 3/2005 | Dooley et al. |
| 7,085,747 | B2 | 8/2006 | Schaffer et al. |
| 8,010,279 | B2 | 8/2011 | Kobuya et al. |
| 8,775,156 | B2 | 7/2014 | Lebeau et al. |
| 8,838,382 | B2 | 9/2014 | Drysdale |
| 9,087,344 | B2 | 7/2015 | Maranhas et al. |
| 9,310,955 | B2 | 4/2016 | Haswell et al. |
| 10,032,181 | B1 | 7/2018 | Madhow et al. |
| 10,652,693 | B2 | 5/2020 | Jadav et al. |
| 11,310,624 | B2 | 4/2022 | Mukherjee-Roy et al. |
| 2002/0167408 | A1* | 11/2002 | Trajkovic ............... G06Q 30/06 340/573.1 |
| 2003/0104824 | A1* | 6/2003 | Hale ...................... G09B 5/125 455/456.1 |
| 2004/0030491 | A1* | 2/2004 | Hull ...................... H04W 4/024 701/433 |
| 2005/0264416 | A1 | 12/2005 | Maurer |
| 2007/0133756 | A1 | 6/2007 | Graves et al. |
| 2008/0221862 | A1 | 9/2008 | Guo et al. |
| 2009/0177461 | A1 | 7/2009 | Ehsani et al. |
| 2009/0216547 | A1 | 8/2009 | Canora et al. |
| 2010/0332115 | A1* | 12/2010 | Erhardt .................. G01C 21/20 701/532 |
| 2013/0024203 | A1* | 1/2013 | Flores ................... G06Q 30/02 705/1.1 |
| 2013/0231824 | A1 | 9/2013 | Wilson et al. |
| 2014/0050053 | A1* | 2/2014 | Sumioka ................ G01C 21/20 367/118 |
| 2014/0357261 | A1 | 12/2014 | Chiu |
| 2015/0056961 | A1 | 2/2015 | Jones et al. |
| 2015/0081348 | A1 | 3/2015 | Avera et al. |
| 2016/0005053 | A1 | 1/2016 | Klima et al. |
| 2016/0140846 | A1 | 5/2016 | Outwater et al. |
| 2016/0163204 | A1 | 6/2016 | Raptopoulos et al. |
| 2016/0212591 | A1* | 7/2016 | Kim ...................... H04W 4/021 |
| 2016/0217695 | A1 | 7/2016 | Peeters et al. |
| 2016/0277560 | A1 | 9/2016 | Gruberman et al. |
| 2016/0300164 | A1 | 10/2016 | Dailly et al. |
| 2016/0321548 | A1 | 11/2016 | Ziskind et al. |
| 2017/0277191 | A1 | 9/2017 | Fairfield et al. |
| 2017/0318149 | A1 | 11/2017 | Daoud |
| 2017/0343375 | A1 | 11/2017 | Kamhi et al. |
| 2018/0196415 | A1 | 7/2018 | Iagnemma et al. |
| 2018/0240176 | A1* | 8/2018 | Cronin .................. H04L 67/22 |
| 2018/0357907 | A1 | 12/2018 | Reiley et al. |
| 2018/0359580 | A1 | 12/2018 | Aran |
| 2019/0137290 | A1 | 5/2019 | Levy et al. |
| 2020/0033882 | A1 | 1/2020 | Zysk, Jr. et al. |
| 2020/0084572 | A1 | 3/2020 | Jadav et al. |
| 2020/0154234 | A1 | 5/2020 | Mukherjee-Roy et al. |
| 2020/0275249 | A1* | 8/2020 | Kim ....................... H04W 4/00 |

OTHER PUBLICATIONS

Anonymous, "Watson historical tours," IP.com Prior Art Database Technical Disclosure, No. IPCOM000245570D, Mar. 17, 2016, 4 pages.

Mallik, N., "What is Bluetooth Low Energy (BLE) beacon technology? How does it work?" beaconstac, Aug. 5, 2014, 10 pages, retrieved on Sep. 7, 2018 from https://blog.beaconstac.com/2014/08/beacon-faqs-everything-you-need-to-know/.

The Economist, "The connected car Smartphones on wheels," The Economist, Sep. 6, 2014, 15 pages, retrieved from https://www.economist.com/technology-quarterly/2014/09/06/smartphones-on-wheels on Sep. 10, 2018.

Jadav et al., U.S. Appl. No. 16/127,106, filed Sep. 10, 2018.

Restriction Requirement from U.S. Appl. No. 16/127,106, dated Mar. 5, 2019.

Non-Final Office Action from U.S. Appl. No. 16/127,106, dated May 1, 2019.

Final Office Action from U.S. Appl. No. 16/127,106, dated Oct. 17, 2019.

Notice of Allowance from U.S. Appl. No. 16/127,106, dated Jan. 6, 2020.

Mukherjee-Roy et al., U.S. Appl. No. 16/740,068, filed Jan. 10, 2020.

List of IBM Patents or Patent Applications Treated as Related.

Non-Final Office Action from U.S. Appl. No. 16/740,068, dated Feb. 8, 2021.

Notice of Allowance from U.S. Appl. No. 16/740,068, dated Feb. 18, 2022.

Final Office Action from U.S. Appl. No. 16/740,068, dated Aug. 5, 2021.

* cited by examiner

COGNITIVE LOCATION AND NAVIGATION SERVICES FOR CUSTOM APPLICATIONS

BACKGROUND

The present invention relates to cognitive and/or beacon-based communication techniques to provide new and/or improved services to users based on location information. More specifically, the presently described inventive concepts include several applications of precise, accurate location services in a cognitive manner that adapts to the specific needs of individual users in the context of the location and activity in which the user is engaged.

Exemplary activities include: providing multilingual navigational guidance and point-specific communication, e.g. within a transit facility; providing cognitive navigational guidance through a tourist attraction, e.g. to tailor a user's experience based on user preferences and conditions at the attraction; and facilitating communication with a user's vehicle, e.g. to summon a vehicle to a precise location at a precise time using beacon technology.

For instance, in the context of assisting travelers in a transit facility, as is well known by any experienced traveler, transit hubs such as airports, bus stations, train stations, metro/subway stations, harbors, ferries, docks, etc. are often chaotic, cacophonous environments with much activity and noise occurring in a hurried environment. As a result it becomes quite easy for an individual to become lost, or be unable to navigate to a desired destination such as a certain gate, terminal, platform, dock, etc. Announcements made over a public system may be inaudible, or in a language not understood by a given traveler. All these challenges lead to a difficult situation when attempting to navigate through a transit hub or equivalent space. These challenges are exacerbated for the case of inexperienced, challenged, or incapacitated individuals including children, individuals suffering from degenerative diseases such as Alzheimer's disease, dementia, etc., hearing-impaired and/or visually-impaired individuals, or any other class that may experience difficulty receiving or following instructions. Even for those without additional challenges, navigating a transit hub can be a difficult experience.

Regarding navigating a tourist attraction, most travelers, especially those who travel by themselves and not in organized groups, are unable to afford human guides who can help enhance their experience through an interactive tour. Though group-guided tours are more affordable, the experience the guide provides depends on the group preferences rather than an individual's preference. The quality of experience is also completely dependent on the experience, capabilities, and enthusiasm of the guide. Accordingly, most travelers are faced with a dilemma of choosing between attempting to navigate tourist attractions on their own, without expert guidance, or to join a group experience, but sacrifice the individual nature of the experience and possibly not be able to experience certain exhibits about which the individual tourist is most interested.

In the context of vehicular communication, quite often, a scenario occurs where someone is leaving the office space, mall, museum, theme park etc. sometimes with loads of bags and items. In such a case, going to the user's vehicle is a troubling experience for the user. Current technology exists where the user can click on a button and the car can reach close to the user detecting the user's location when the user exists the building. However, the exact coordinates detection is always a problem due to inaccuracy in fetching the exact GPS coordinates of the user. Also, if the user exits from the backdoor or a different location of the building, which is not essentially the main exit (where the user's vehicle is mostly capable of coming around), then, this might lead to incorrect and inaccurate location being fetched by the car while tracking the user. Even an error of as small as 10 meters or less can cause a vehicle to be located, e.g. on the opposite side of the street as the user. While an error of 10 meters may seem a minor distance, if the street is a busy one, or separated by impassable obstacles such as a fence, drainage ditch, subway tunnel, bridge, etc. then even this low amount of error can be a critical failure in the context of the use-case in question.

Accordingly, it would be beneficial to provide improved indoor location services that are context-aware and configured to provide application-specific services without suffering from the shortcomings of the prior art.

SUMMARY

In one embodiment, a computer-implemented method for cognitive navigational guidance through a tourist attraction includes: receiving a request for cognitive navigational assistance through a tourist attraction; obtaining site-specific information about the tourist attraction from a site-specific server; determining whether a user profile describing user viewing preferences exists; and either: directing the user to navigate through the tourist attraction according to a path based on the existing user profile; or recommending a first exhibit to visit based at least in part on crowding levels at the tourist attraction and recording user behavior observed while viewing the first exhibit.

In still yet another embodiment, computer program product for cognitive navigational guidance through a tourist attraction, the computer program product comprising a computer readable storage media having program instructions embodied therewith, the program instructions readable and/or executable by a processor to cause the processor to: receive, at the processor, a request for cognitive navigational assistance through a tourist attraction; obtain, by the processor, site-specific information about the tourist attraction from a site-specific server; determine, by the processor, whether a user profile describing user viewing preferences exists; and either: direct, by the processor, the user to navigate through the tourist attraction according to a path based on the existing user profile; or recommend, by the processor, a first exhibit to visit based at least in part on crowding levels at the tourist attraction and record, by the processor, user behavior observed while viewing the first exhibit.

In more embodiments, a system for cognitive navigational guidance through a tourist attraction includes a processor; and logic integrated with the processor, executable by the processor, or integrated with and executable by the processor, the logic being configured to: receive a request for cognitive navigational assistance through a tourist attraction; obtain site-specific information about the tourist attraction from a site-specific server; determine whether a user profile describing user viewing preferences exists; and either: direct the user to navigate through the tourist attraction according to a path based on the existing user profile; or recommend a first exhibit to visit based at least in part on crowding levels at the tourist attraction and record user behavior observed while viewing the first exhibit.

Other aspects and embodiments of the present invention will become apparent from the following detailed description, which, when taken in conjunction with the drawings, illustrate by way of example the principles of the invention.

DETAILED DESCRIPTION

Figure 1:
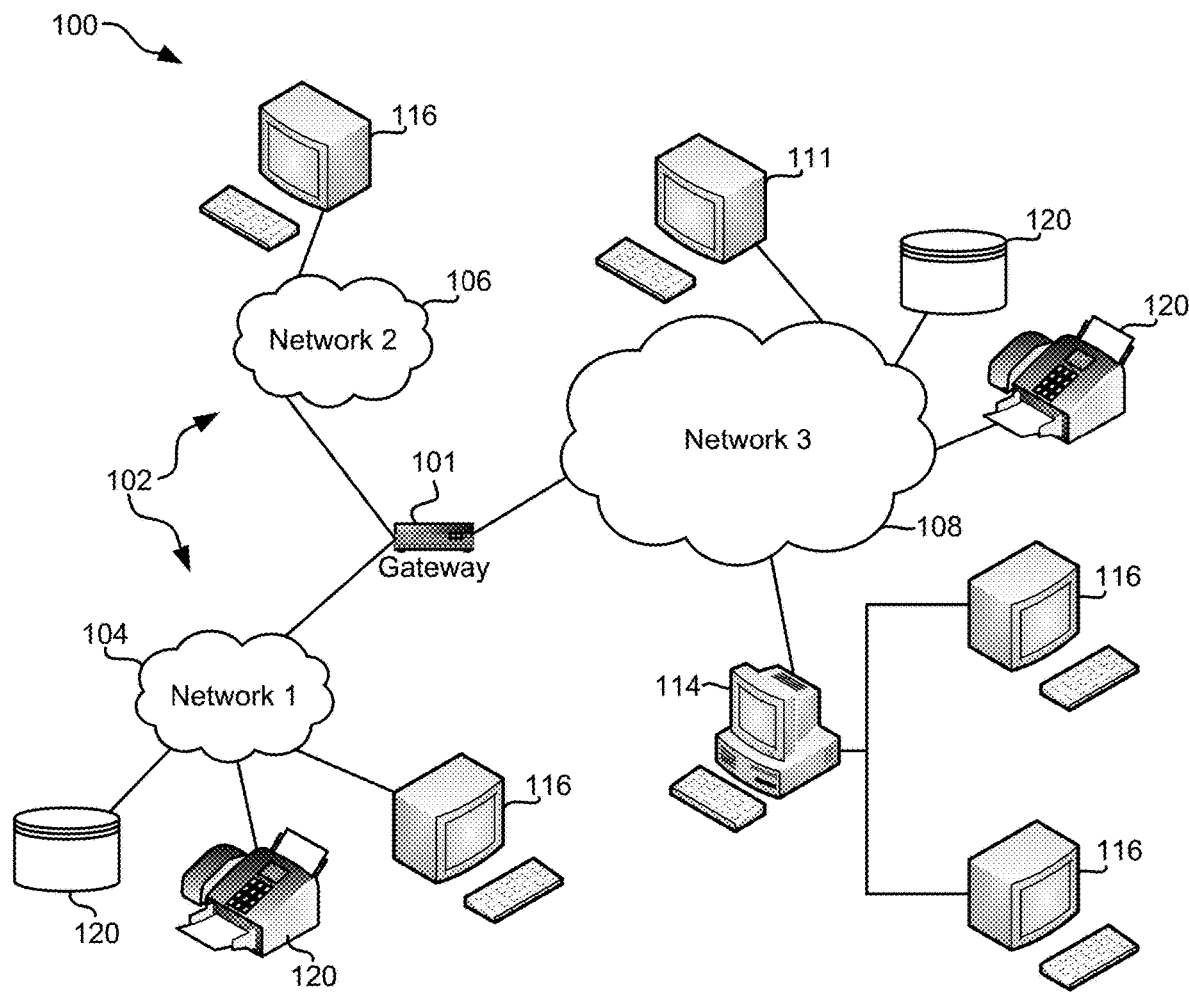
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for cognitive and/or beacon-based communication techniques to provide new and/or improved services to users based on location information. More specifically, the presently described inventive concepts include several applications of precise, accurate location services in a cognitive manner that adapts to the specific needs of individual users in the context of the location and activity in which the user is engaged. Exemplary activities include: providing multilingual navigational guidance and point-specific communication, e.g. within a transit facility; providing cognitive navigational guidance through a tourist attraction, e.g. to tailor a user's experience based on user preferences and conditions at the attraction; and facilitating communication with a user's vehicle, e.g. to summon a vehicle to a precise location at a precise time using beacon technology.

Of course, other applications and exemplary implementations of techniques and systems for providing customized location services will become apparent to those having ordinary skill in the art upon reading the present descriptions, and it should be understood that all such applications, implementations, etc. equivalent to those described herein are to be considered part of the same inventive concept.

In one general embodiment, a computer-implemented method for multilingual, point-specific communication includes: receiving a request for delivery of announcements relating to a particular event; receiving or retrieving itinerary information corresponding to the particular event and a user that submitted the request; receiving audio data from a location corresponding to the particular event based at least in part on the itinerary information; translating the audio data into a plurality of translated messages, each translated message being in a different language; and providing at least one of the translated messages to the user that submitted the request.

In another general embodiment, a computer program product for multilingual, point-specific communication includes a computer readable medium having program instructions embodied therewith, wherein the computer readable storage medium is not a transitory signal per se, and the program instructions are executable by a mobile device to cause the mobile device to perform a method comprising: receiving, at a server, a request for delivery of announcements relating to a particular event; receiving or retrieving, at or by the server, itinerary information corresponding to the particular event and a user that submitted the request; receiving, at the server, audio data from a location corresponding to the particular event based at least in part on the itinerary information; translating, by the server, the audio data into a plurality of translated messages, each translated message being in a different language; and providing, by the server, at least one of the translated messages to the user that submitted the request.

In more general embodiments, a system for multilingual, point-specific communication includes a processor; and logic integrated with the processor, executable by the processor, or integrated with and executable by the processor, the logic being configured to: receive a request for delivery of announcements relating to a particular event; receive or retrieve itinerary information corresponding to the particular event and a user that submitted the request; receive audio data from a location corresponding to the particular event based at least in part on the itinerary information; translate the audio data into a plurality of translated messages, each translated message being in a different language; and provide at least one of the translated messages to the user that submitted the request.

In yet another general embodiment, a computer-implemented method for cognitive navigational guidance through a tourist attraction includes: receiving a request for cognitive navigational assistance through a tourist attraction; obtaining site-specific information about the tourist attraction from a site-specific server; determining whether a user profile describing user viewing preferences exists; and either: directing the user to navigate through the tourist attraction according to a path based on the existing user profile; or recommending a first exhibit to visit based at least in part on crowding levels at the tourist attraction; and recording user behavior observed while viewing the first exhibit.

In still yet another general embodiment, a computer program product for cognitive navigational guidance through a tourist attraction includes a computer readable medium having program instructions embodied therewith, wherein the computer readable storage medium is not a transitory signal per se, and the program instructions are executable by a mobile device to cause the mobile device to perform a method comprising: receiving, at the mobile device a request for cognitive navigational assistance through a tourist attraction; obtaining, by the mobile device, site-specific information about the tourist attraction from a site-specific server; determining, by the mobile device, whether a user profile describing user viewing preferences exists; and either: directing, by the mobile device, the user to navigate through the tourist attraction according to a path based on the existing user profile; or recommending, by the mobile device a first exhibit to visit based at least in part on crowding levels at the tourist attraction; and recording, by the mobile device, user behavior observed while viewing the first exhibit.

In more general embodiments, a system for cognitive navigational guidance through a tourist attraction includes a processor; and logic integrated with the processor, executable by the processor, or integrated with and executable by the processor, the logic being configured to: receive a request for cognitive navigational assistance through a tourist attraction; obtain site-specific information about the tourist attraction from a site-specific server; determine whether a user profile describing user viewing preferences exists; and either: direct the user to navigate through the tourist attraction according to a path based on the existing user profile; or recommend a first exhibit to visit based at least in part on crowding levels at the tourist attraction; and record user behavior observed while viewing the first exhibit.

In a further general embodiment, a computer-implemented method for beacon-based communication with a vehicle includes: summoning a vehicle to a designated position; communicating with one or more location sensors deployed throughout a location including the designated position; determining a user has exited a building at the location based on the communication with the one or more location sensors; and transmitting the user's position to the summoned vehicle. Notably, the user's position is accurate to within 10 inches.

In still further general embodiments, a computer program product for beacon-based communication with a vehicle includes a computer readable medium having program instructions embodied therewith, wherein the computer readable storage medium is not a transitory signal per se, and the program instructions are executable by a mobile device to cause the mobile device to perform a method comprising: summoning, by a mobile device, a vehicle to a designated position; communicating, by the mobile device, with one or more location sensors deployed throughout a location including the designated position; determining, by the mobile device, a user has exited a building at the location based on the communication with the one or more location sensors; and transmitting, by the mobile device, the user's position to the summoned vehicle. Notably, the user's position is accurate to within 10 inches.

In still yet a further general embodiment, a system for beacon-based communication with a vehicle includes a processor; and logic integrated with the processor, executable by the processor, or integrated with and executable by the processor, the logic being configured to: summon a vehicle to a designated position; communicate with one or more location sensors deployed throughout a location including the designated position; determine a user has exited a building at the location based on the communication with the one or more location sensors; and transmit the user's position to the summoned vehicle. Notably, the user's position is accurate to within 10 inches.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
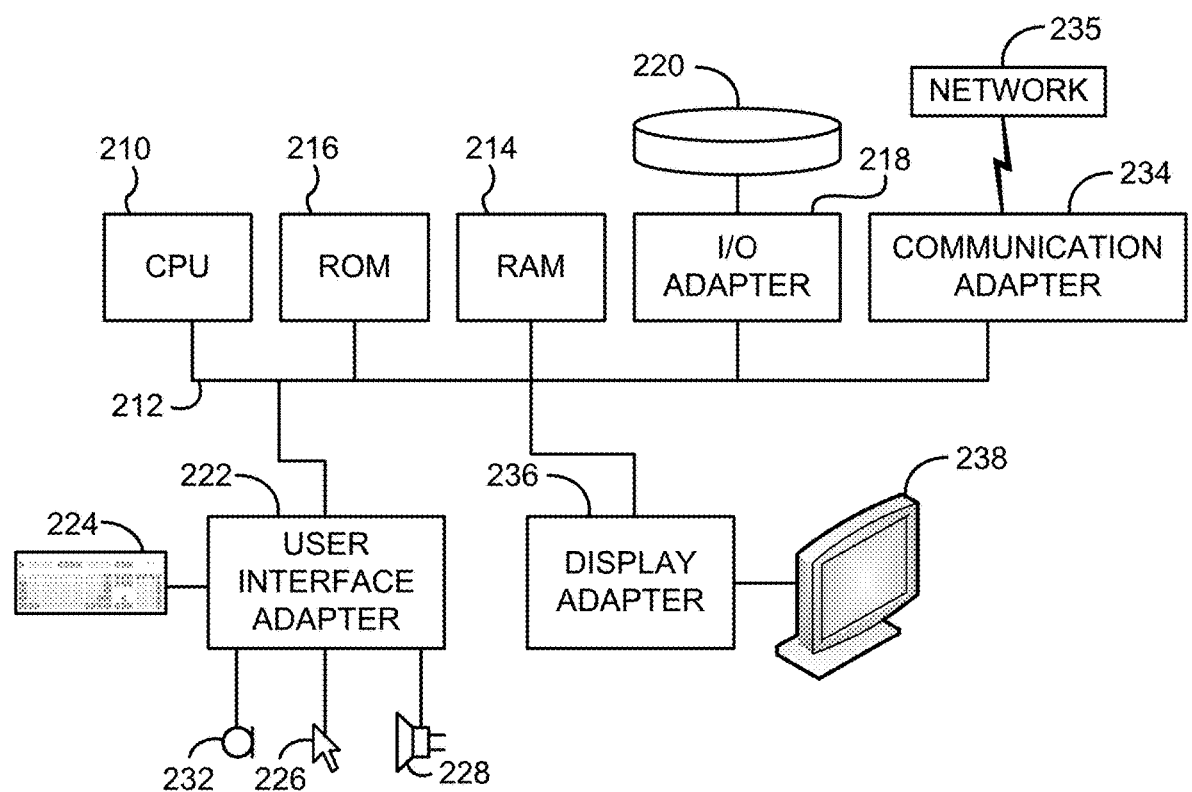
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Returning now more specifically to the notion of providing location services in the context of multilingual point-specific communications, navigating through a tourist attraction, and communicating with vehicles, in various embodiments the presently described inventive concepts shall be understood as including some or all of the following features, functions, and/or modalities, in any suitable combination, permutation, etc. Moreover, except to the extent expressly disclosed as being mutually exclusive, or as would be appreciated by a skilled artisan as necessarily being the case, any two features of the invention detailed herein may be used together, without limitation.

While the exemplary contexts/scenarios in which the inventive concepts may be implemented are presented individually below, it should be appreciated that various embodiments of the invention may combine different aspects of each individual embodiment, without limitation. For example, a tour guide may require multilingual support to provide quality service to customers who do not share the guide's native tongue, and need to access multilingual, point-specific communication techniques as presently disclosed in order to describe different exhibits in multiple languages. Similarly, a tour guide may wish or need to summon transportation for a customer to navigate to an attraction, or from one attraction to another, and thus need to leverage vehicular communication capabilities as described herein. Moreover still, transit hubs may cooperate with local ride-sharing services or other vehicular transportation, and may wish to deploy available vehicles to the traveler's location or distribute pickup zones throughout the transit hub to minimize traffic, and wish to leverage beacon-based vehicular communication as described herein.

Those having ordinary skill in the art upon reading the present descriptions will appreciate the foregoing exemplary combinations of inventive concepts presented herein are merely illustrative, and not intended to be limiting in any way. Rather, these examples and any others that a skilled artisan would comprehend upon reading the instant disclosure should be understood as part of the presently described inventive concepts.

Point-Specific Communication

In many public areas, including shops (especially larger varieties such as malls, department stores, outlets, and outdoor shopping facilities), public arenas such as sporting venues, transit hubs (e.g. airports, bus stations, train stations, subway stops, terminals), etc. individuals need to be present in a specific location at a specific time, e.g. present at a point of sale, point of entry, particular seat assignment, etc. prior to a time of departure, event start time, etc.

Due to many factors, including high levels of ambient noise common to such venues, confusion due to unfamiliarity with the location, distraction due to ongoing activities, vendors, other travelers/participants, etc. it is common for an individual to not receive, or not appreciate and understand, information critical to the individual.

For example, since most venues of the type in question employ a public announcement (PA) system (optionally in conjunction with other means such as informational displays and human assistants) to convey critical information such as gate changes, requests for an individual to report to a particular location, cancellations, delays, upcoming events (e.g. arrival, boarding, departure, etc.) and the venues are commonly subject to high levels of ambient noise as well as distracted travelers/participants, announcements made over a PA system are frequently missed, misinterpreted, or otherwise lost.

Moreover, even if the environment is conducive to clear communication the individual may not comprehend the language in which announcements are made/information is displayed.

Accordingly, breakdowns in communication/information exchange are common in such public settings, and can be of extreme detriment where the missed information is critical to an individual's desired goal, whether reaching a travel destination or simply enjoying a recreational activity.

Moreover, even individuals who can fully comprehend the information conveyed, and are in an environment where comprehension is facile, circumstances may require the individual to stay near a particular location such as a gate or announcement board for extended periods of time and to great inconvenience. For example, if a train, bus, car, or flight is delayed indefinitely, customers must stay near the gate for further information, and may not leave to take care of simple but basic needs without risking missing the critical update.

The presently disclosed inventive concepts, therefore, relate in one embodiment to providing information to an individual accurately and in a timely fashion, regardless of the user's position and ability to comprehend announcements provided via conventional means such as a public announcement system, information board, etc. This notion is also referred to herein as "point-specific communication," in various embodiments.

In one approach, information may be transmitted through each user's mobile device, rather than through a PA system or other public announcement subject to being drowned out by ambient noise. Advantages of using an individual's mobile phone for this purpose are manifold.

First, individuals tend to keep mobile devices close at hand, and pay close attention to signals/messages received thereby. Accordingly, an individual (even a distracted or impaired individual) is more likely to receive the information in question than using an information board or other equivalent.

Second, mobile devices are capable of being used with personal audio equipment, or placed very close to the ear, such that ambient noise (while still being present in the same amount) does not interfere with, or at least does not defeat an individual's ability to hear and comprehend spoken instructions.

Third, based on user-specified preferences, information provided to the individual may be customized and/or custom processed. For example, in one embodiment signals may be modified prior to transmission, e.g. to translate a given statement into a plurality of languages and transmit each language with a flag or other indicator (e.g. metadata)

indicating the language included in the transmission. Subsequently, users may interpret only signals tagged with the user's language of choice. Similarly, a signal may be received and based on user preferences translated upon receipt. Of course, other modifications such as unit conversions, etc. could facilitate the user's understanding of the circumstances, and should be considered within the scope of the presently described inventive concepts. e.g. so that incoming directions are converted to a language of choice, unit of choice (e.g. feet versus meters), etc., Such modifications may be performed before transmission of the information, e.g. by a server, or after receipt by the mobile device, in various embodiments.

Fourth, messages may be provided independent of an individual's location. For example, announcements made over a PA system or information board tend to relate only to locations/events occurring within close physical proximity (e.g. within 50-100 feet) of the speaker, since the audible/visible range of the speaker/display is limited and individuals tend to congregate near their required/desired destination point so as to accomplish the underlying goal of travel/event participation. By sending messages to a mobile phone rather than to/at a specific location, the intended recipient may receive, review, and clearly comprehend the contents of the message regardless of location. This frees individuals from being "tethered" to or close-by the location they ultimately need to report to travel or otherwise participate in the relevant event/activity.

Fifth, to assist individuals in timely reporting to required locations, an individual's mobile device location services may be employed to ensure a user is within a predetermined proximity of a required location within a threshold amount of time (e.g. 5 minutes, 15 minutes, 30 minutes, etc. depending on type of event and/or user preference) prior to departure/event starting/etc., in various embodiments. It will be appreciated by skilled artisans that indoor location services are challenging to provide, especially in situations such as metro stations where satellite-based and other conventional location techniques are not applicable.

Accordingly, and again using the mobile device, in preferred embodiments an individual's location may be tracked within a given environment, e.g. an airport, train station, etc. using Bluetooth Low Energy (BLE) beacon technology and associated software configured to track location within a given environment, e.g. based on a predefined floor plan, map, etc. provided to the user's mobile device and used in conjunction with BLE beacons to exchange signals and enable providing location services indoors. Of course, other technology besides BLE beacons, such as Wi-Fi location technology, radio-frequency identification (RFID) technology, etc. may be employed additionally or alternatively to the extent suitable given the environmental constraints, as would be understood by a person having ordinary skill in the art upon reading the present descriptions.

This tracking capability provides a sixth advantage of communicating via a user's mobile device in a point-specific manner rather than a conventional PA system or the like. Namely, individuals may be tracked so that a warning or message may be provided in sufficient time to enable the individual to return to the required area or otherwise be secured.

For example, consider a child or individual with a debilitating mental condition. If either wanders away from the departure gate or equivalent thereof in the context of the particular event being attended, then a warning may be issued well ahead of the planned departure, ensuring enough time to recover the lost individual and return to the required area.

Of course, the same functionality may be even more useful for able-bodied/minded individuals, e.g. individuals prone to distraction via various vendors present at an airport, etc. If the individual gets "lost" in the side-activity and winds up very far away from the required destination, then an early warning may be issued to begin moving in the direction of the required destination so as to arrive in time to participate in the intended travel/activity.

In operation, the system functions as follows. A system 300, preferably installed/located in a busy venue such as a transit hub, sporting arena, concert venue, etc. is fitted with a network of location sensors 302. The location sensors preferably include, but are not limited to, Bluetooth Low Energy (BLE) location sensors, especially for indoor areas within the venue's borders.

A customer enters the venue to procure services. The customer carries a mobile device 304, which preferably includes a custom mobile application to guide the customer through the area and the process of being in the required final location at the required time. Alternatively, customers may download such an application upon arrival at the venue. The point-specific communication functionality may additionally or alternatively be provided via a web interface or as a web service, in more embodiments.

Regardless of the way the service is accessed, the user's mobile device is communicatively coupled to a translation engine 306 and one or more of the various location sensors 302 at any given point in time. The location sensors 302 and translation engine 306 are each communicatively coupled to a server 308 hosting these capabilities for the venue. As the user navigates through the space of the venue, signals are received from the location sensors 308 by the user's mobile device 304, and used to estimate position of the user device 304, e.g. using a fingerprinting technique, a trilateration technique, a triangulation technique, or combinations thereof, in various embodiments.

The user, preferably prior to entering the venue or immediately upon accessing the location services, provides critical information for location services, which is stored locally on the mobile device as a profile. Ideally, the user profile includes at least one language as a preferred language for speaking and/or at least one language as a preferred language for reading/listening. Of course, the user may specify multiple languages read/written/spoken, and optionally an order of preference for each activity.

The user profile also preferably includes appropriate itinerary information, such as an arriving/departing terminal, gate number, time of arrival/departure, airline, airport (or equivalently train station, bus station, metro station, etc.) seat number, special programs or considerations (e.g. priority boarding, active military, special needs, name of guardian/conservator, travel status, etc.), and identifying information for the individual, e.g. name, address, date of birth, etc. Preferably, all connecting travel arrangement information is also specified in the itinerary portion of the user profile. In this manner, all necessary information for participating in the activity in question is provided in the user profile, and may be retrieved automatically when needed, e.g. when in proximity to the arrival/departure gate, as determined using location sensors. However, in some approaches the itinerary information may be provided separately, e.g. at the time of departure, manually by the user.

Upon providing the user profile, and itinerary information if not in the user profile, upon arrival at the venue, the user's mobile device 304 interfaces with the translation engine 306 and location sensors 302 to provide necessary information ensuring the user is in the right location at the right time to catch their ride, show, or other activity.

To do so, the translation engine 306 also receives audio from various speakers 310 placed throughout the environment, e.g. near gates, entryways, etc. By coordinating with the server 308, the translation engine 306 can determine whether a given message relates to a given passenger's current or ultimate location (e.g. based on matching the departure gate information specified in the itinerary with a gate number associated with a speaker from which audio was received); if so whether the given message is currently relevant to the given passenger (e.g. based on comparing current time versus departure time specified in the itinerary information, and optionally a departure announcement time window); if necessary translate that message to the passenger's desired written or spoken language (e.g. based on language preferences and messaging preferences specified in the user profile), and provide the relevant information to the user, e.g. as a written text or spoken audio call/message (again, based on the messaging preferences) in the desired language (based on the language preferences) and delivered via the user's mobile device 304.

Exemplary Embodiment 1

For example, in one exemplary implementation point specific communications include receiving a request for delivery of voice/text updates regarding gate announcements. The request may be received in connection with a user checking-in to an upcoming travel event ahead of the event, and/or at the time of the event, e.g. from a desktop used to check in 24 hours ahead of the planned travel, via a kiosk at the venue shortly before the scheduled departure, and/or via a user's mobile device 304. The user submits itinerary information and other user profile information with the request, if not previously submitted.

At any rate, in response to the request, the user is provided or instructed to download gate specific information from a travel application. The gate specific information may be automatically provided if the user has previously downloaded the travel application and has provided the relevant gate information ahead of time, e.g. in the itinerary section of the user profile. Otherwise gate-specific information may be provided upon the user manually specifying the relevant gate information.

Upon receiving the gate information, audio data picked up from speakers 310 in the vicinity of the specified gate are transmitted to a translation engine 306 and translated into a plurality of destination languages, which in turn are stored, e.g. in a buffer, on a memory, on a data storage device, etc. of the translation engine 306, server 308, or some other storage system (not shown) communicatively coupled to the system 300 via server 308.

Figure 3:
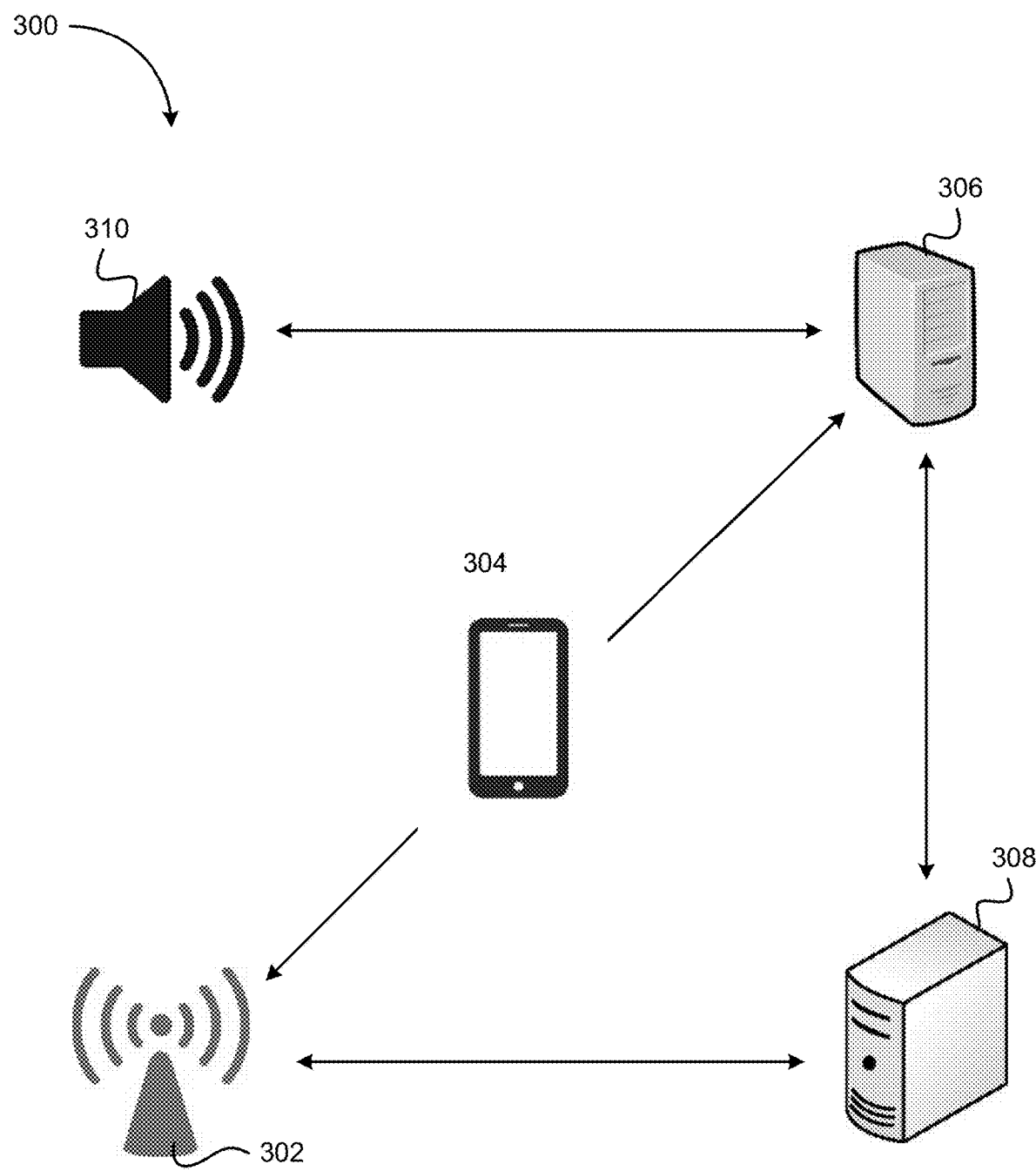
FIG. 3 is a simplified schematic of a system providing multilingual, point-specific communication, in accordance with one embodiment.

Though shown as distinct components in FIG. 3, it should be appreciated that in various embodiments the translation engine 306 may be a part of, or integrated with, server 308. Moreover, in additional embodiments the translation engine 306 and server 308 may be components of a single overall point-specific communication system including the location sensors 302, translation engine 306, server 308, speakers 310, and all supporting connections/underlying hardware, etc. The point-specific communication system does not include the user's mobile device, though in other embodiments dedicated mobile devices such as handheld devices, headsets, wearables, etc. may be provided at a location for purposes of point-specific communication.

Periodically, a server 308 reads translations stored on the translation engine 306, server, 308, or other storage system, and consults all user profiles associated with the gate number from which audio data corresponding to a given translation was collected. The server consults the user profiles to determine language and messaging (i.e. voice/text) preferences, and assembles either an appropriate message or instructions for the translation engine 306 to assemble an appropriate message relaying the information from the relevant gate to the user in the user's preferred language and form of expression.

Exemplary Embodiment 2

In another exemplary embodiment of point-specific communication, a user arrives at a venue hosting system 300 and is provided, or instructed to download, gate specific information from a travel application. The gate specific information may be automatically provided if the user has previously downloaded the travel application and has provided the relevant gate information ahead of time, e.g. in the itinerary section of the user profile. Otherwise gate-specific information may be provided upon the user manually specifying the relevant gate number, flight number, departure time, etc.

Upon specifying the relevant gate information, the user's mobile device 304 communicates with a plurality of location sensors 302 positioned throughout the environment so as to track the user's position over time. The particular manner of tracking position is beyond the scope of the point specific communications embodiment of the presently described inventive concepts.

At a predetermined amount of time prior to scheduled departure, which may be a default amount of time or an amount specified by the user, and in either case may e.g. be 15 minutes, 30 minutes, 45 minutes, 60 minutes, etc., the system begins periodically determining whether the user is at least a predetermined distance away from the departure gate. If not, then the system may wait a predetermined delay period, e.g. 1 minute, 5 minutes, 15 minutes, an hour, a day, etc. and repeat the determination. If the user is beyond the predetermined distance from the departure gate, then an alarm is sent from the server 306 to the individual's mobile phone 304 to advise the individual to return to the gate as soon as possible.

Additionally or alternatively, e.g. if a flag is set in the user's profile indicating the individual is subject to the guardianship of another, or otherwise may require assistance, then a message may also be sent to the designated guardian/next of kin/etc. mobile phone, contact information for which may be designated in the dependent individual's profile.

Several exemplary embodiments of point-specific communication have been described herein above. The exemplary descriptions are to be understood as illustrative in nature, and are not to be taken as limiting on the scope of the inventive concepts disclosed herein.

Figure 4:
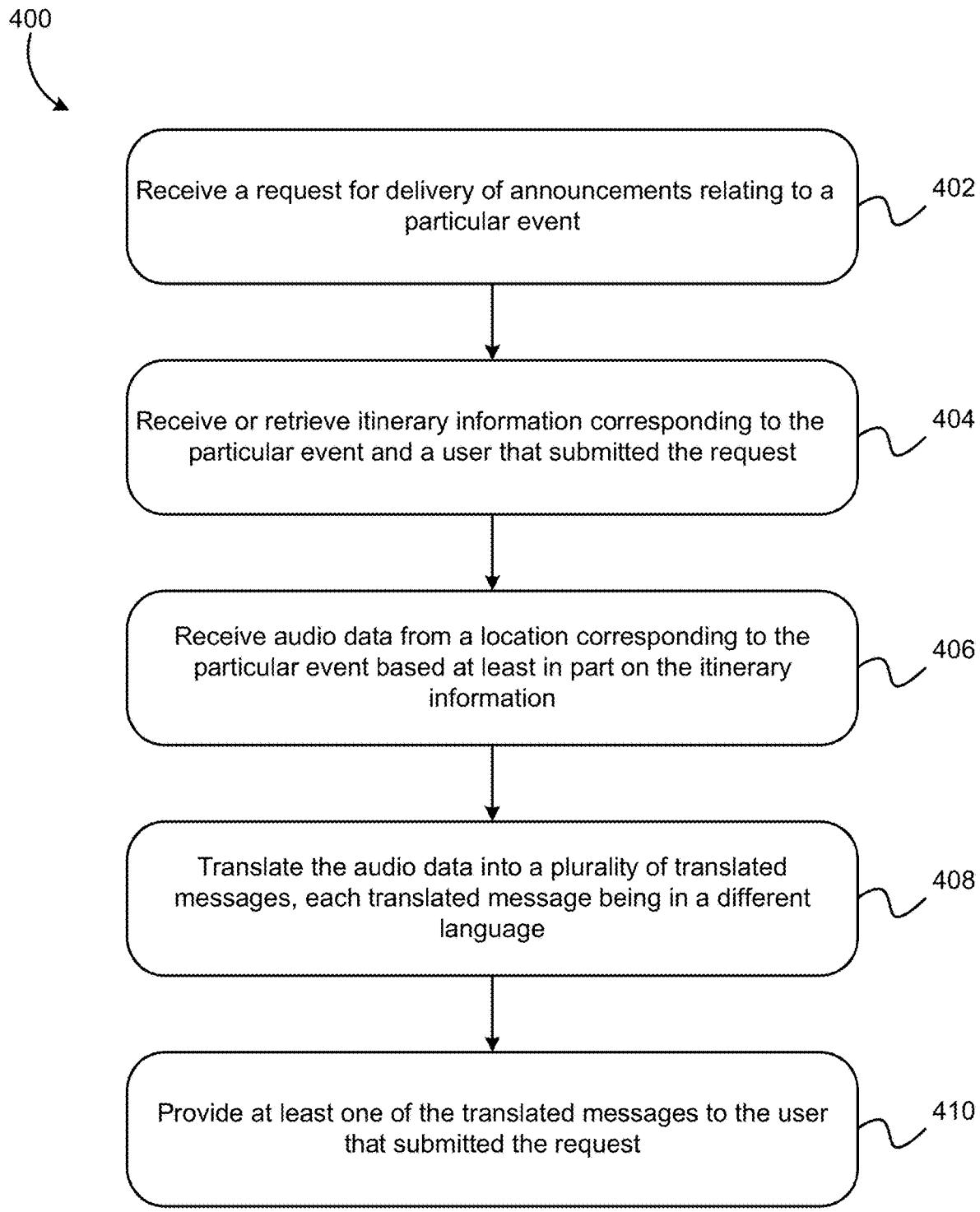
FIG. 4 is a flowchart of a method for multilingual, point-specific communication, in accordance with one embodiment.

Now referring to FIG. 4, a flowchart of a method 400 is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a server, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a request for delivery of announcements relating to a particular event is received. The request is preferably received at a server, e.g. server 308 via the user's mobile device 304, but may optionally be received from another computer or kiosk, e.g. a pre-flight check in or even beforehand. The particular event may be any suitable type of event but in preferred approaches involves travel to/from at least one busy transit hub such as an airport, train station, metro station, etc.

In operation 404, itinerary information corresponding to the particular event are received, or alternatively retrieved (e.g. from a database storing user profiles). The itinerary information corresponds to the user that submitted to the request, e.g. in that the user is the event participant, or the user made arrangements for the event participant (e.g. as a parent for a child traveling unaccompanied). Preferably, the itinerary information includes some or all of the exemplary types of information specified above, such as an arriving gate number, a departing gate number, a time of arrival, a time of departure, an airline, an airport, a seat number, and identifying information for the user who submitted the request or another traveler. Most preferably, the itinerary information includes at least a gate/entry number and start/departure time for the event in question.

The gate/entry number and start/departure time can be utilized to determine which locations within the venue from which to collect audio data, ideally only collecting, processing, and relaying information relevant to the particular user/event participant. For instance, in one embodiment only announcements made from speakers within a predetermined threshold distance of a gate number matching the gate number specified in the user's itinerary information will be relayed. In preferred approaches, the threshold is a distance of about 100 horizontal feet or less, 50 horizontal feet or less, etc. in various embodiments.

In another approach, only announcements made 1 hour or less prior to a scheduled event start time/departure time will be relayed to the user. Of course, other time frames for relaying announcements may be chosen by the user or determined based on the type of event, venue, etc. as would be appreciated by a person having ordinary skill in the art upon reading the present descriptions.

With reference again to FIG. 4, method 400 includes operation 406, where audio data are collected from a location corresponding to the particular event based at least in part on the itinerary information. Preferably, the audio data are collected within a predefined window of distance and time with respect to the event initiation. For instance, audio data may be collected only from speakers within a predetermined distance of a specified location, only within a predefined duration of an event start time, etc. as would be appreciated by a skilled artisan upon reading the present disclosures. Exemplary distances include any distance within audible range of the speaker, or less, such as 50 feet, 100 feet, 150 feet, 200 feet, etc. in various embodiments and depending on environmental conditions at the venue. Exemplary time windows include 1 hour or less before event initiation, 2 hours or less before event initiation, etc. in various embodiments.

In operation 408, the audio data are translated into a plurality of translated messages, each message being in a different language. The audio data may be preferably translated using translation engine 306 and a plurality of translation models to generate the individual messages, which are ideally stored in a repository for future use. In this manner, the content of the audio data may be simultaneously provided to multiple users each having a different language preference. Additionally or alternatively, messages may be translated only according to user specified languages (e.g. those specified in the user profiles of individuals currently present at the venue) and delivered to the respective user based on preferred language.

Method 400 also includes, in operation 410, where the translated message(s) is/are provided to the user that submitted the request. Multiple messages may be delivered to a single user, e.g. if the user has specified multiple languages, or to multiple different users, e.g. if multiple users having the same or different language preferences have submitted requests for announcements from the same basic location within the venue.

The method 400 as shown in FIG. 4 has been described in accordance with one exemplary approach, but it shall be appreciated that in various embodiments the inventive concept represented by FIG. 4 and method 400 may include any number of additional and/or alternative features, especially including but not limited to those discussed above regarding FIGS. 5-6 for cognitive navigation through a tourist attraction, and beacon-based vehicular communication, respectively.

For instance, in one approach consistent with exemplary embodiment 2, above, method 400 may additionally or alternatively include tracking a location of the user submitting the request using a plurality of location sensors deployed throughout the venue. The method may also include determining, at a predetermined amount of time prior to a scheduled beginning time of the particular event, a distance between a location of the particular event and a location of the user submitting the request, and comparing the distance between the location of the particular event and the location of the user submitting the request against a predetermined maximum pre-departure distance. The maximum pre-departure distance may be any suitable distance, but preferably corresponds to a maximum distance a user can travel in a given amount of time, e.g. an amount of time required to arrive at the start location/departure gate. In various embodiments, the threshold maximum pre-departure distance is less than one mile, and corresponds to an evaluation performed at least one half hour prior to a scheduled departure/event beginning.

With continuing reference to FIG. 4, in some embodiments method 400 includes, in response to determining the distance between the location of the particular event and the location of the user submitting the request is less than the predetermined maximum pre-departure distance, repeating the determination and the comparison after a predefined duration, such as 5 minutes. Alternatively, in response to determining the distance between the location of the particular event and the location of the user submitting the request is greater than the predetermined maximum pre-departure distance, method 400 includes sending an alert to the user submitting the request advising the user to move toward the location of the particular event.

Cognitive Navigational Assistance for Tourist Attractions

Turning now to cognitive guidance through tourist attractions, as noted above in the background tourism is a huge industry, but often individual travelers cannot afford the luxury of a guide to explore and enjoy the available attractions. On the other hand, participating in a group may not allow sufficient time, if any, to visit attractions in which a given individual is particularly (or even uniquely) interested.

Accordingly, a location-based approach to providing customized guidance to tourists, based on many factors such as available time, individual interests in various exhibits, current/historical traffic levels, and/or language preferences, presents a significant improvement to individuals seeking to visit a tourist attraction, particularly an attraction with multiple exhibits such as a museum, gallery, zoo, or the like.

Specifically, the inventive concepts provided herein maximize the time spent observing exhibits rather than waiting in lines, optimize the quality of the experience by attempting to schedule visits where crowds are least prevalent, and prioritizing the order in which exhibits are visited according to user preferences.

The presently disclosed inventive embodiments of navigational assistance through a tourist attraction are importantly cognitive approaches, in that the user's individual preferences, along with other relevant dynamic factors such as crowd size, remaining time available, average time spent at each exhibit, etc. into account in suggesting a particular path to follow through a tourist attraction.

Doing so involves tracking user behavior over time, evolving a model of user interest based on the historical behavior, and applying that model to current conditions to obtain an optimum solution, this time in the form of a path to navigate through a tourist attraction.

Accurate coordinates of the tourist can be identified, e.g. using Bluetooth low energy (BLE) beacons (preferred), Wi-Fi location technology, radio-frequency identification (RFID), and the like using any known technique. Based on a user's current position within a venue, a virtual tour guide, which may be implemented via a virtual assistant prevalent on many mobile devices, will give commentary on the exhibit the tourist is viewing.

Over, time, or based on a user profile specifying the likes and interests of the individual can be learned by the virtual cognitive guide, e.g. using machine learning techniques, and the tourist can be interactively guided to a specific painting or an artifact. Interactive guidance can give a choice and receive a selection of what the individual is interested in and accordingly guide them to the points of interest and also give commentary when the user reaches the object of interest.

The cognitive guide can also optimize tour planning given the interest of the individual, the time budget, and the popularity of an individual exhibit, e.g. based on aggregate visitor traffic. Moreover, a cloud based global knowledge base and tourist spot-specific knowledge base may provide traffic counts at the site, and the user's history of recommended, visited and liked exhibits. The user profile may be stored in the cloud and augmented over time by experiential learning. The foregoing functionality may be provided via an application downloaded to the tourist's mobile device.

The inventive cognitive navigational guidance techniques take as input an identification of the location to be visited, which preferably includes or otherwise enables the cognitive tour guide to obtain a layout or floor map of the area where exhibits are displayed, and pathways between various exhibits. In addition, the guidance techniques leverage available time budget, and the date of the desired visit, so as to plan an optimal window of time based on historical traffic patterns. Optionally, but preferably, the user may also specify preferred language(s) for the cognitive tour guide to take into account when planning a path through a series of exhibits.

As another option, the inventive cognitive tour guide described herein may take as input a profile of interests and/or preferences, which may include a listing of artists, works, museums, styles, genres, eras, art forms, etc. from among which a user may choose to specify whether the user does or does not like each respective data point. For example, a user could build lists of "liked" items and "disliked" items, in one approach. In another approach, a user could "rate" various items on a standard scale, to be interpreted by the cognitive tour guide in recommending exhibits to visit.

This profile indicating user preferences evolves over time as additional information is provided by the user. The additional information may reinforce existing trends/preferences, build new trends/preferences, and/or change preferences over time. Advantageously, the user need only perform the initial setup of the profile, and evolution thereof occurs naturally over time as the user visits more exhibit. The profile may change based on explicit feedback provided by the user, e.g. ratings, likes, etc., and/or implicit feedback, such as amount of time spent viewing various types of exhibit, number of times viewing a given exhibit, artist, genre, etc., social media activity relating to a particular exhibit, artist, genre, style, etc.

At any rate, upon providing the foregoing inputs to the cognitive tour guide/navigational algorithm, the following outputs are returned: an ordered list of three highest priority exhibits to explore, commentary for a selected one of the three highest priority exhibits, and a dynamically generated ordered list of the next three highest priority exhibits to explore. In this manner, the algorithm generates a live recommendation based on current conditions and user preferences, and updates the recommendation in real-time based on each selection made by the user. This dynamic capability is advantageous and requires the algorithm to constantly recalculate optimal paths through the exhibit space based on which of the three suggested exhibits was actually chosen.

Commentary regarding various exhibits may be obtained and/or synthesized from a plethora of sources, such as a script provided by the venue hosting the exhibits, publicly available sources such as Wikipedia, etc. as would be appreciated by a person having ordinary skill in the art upon reading the present disclosure.

EXEMPLARY EMBODIMENT

The presently disclosed inventive concepts regarding cognitive navigational assistance through tourist attractions may be implemented, in one exemplary approach, substantially as follows.

A request for cognitive navigation is received, preferably at a server hosting such cognitive navigation services. The request may be received preferably from a user's mobile device, more preferably a mobile device having installed thereon/therewith a mobile application dedicated to providing cognitive navigation services. In response to receiving the request, a prompt for the user's desired location and time budget are provided, and the user's response returned. Using the desired location and time budget, the server establishes contact with a site-specific server hosted by the museum or a third party, the site-specific server hosting business hours, traffic trends, display schedules, etc. about the desired location, and optionally other locations of the same or similar variety.

After retrieving location-specific information, the cognitive navigational assistance algorithm seeks user preferences, first by determining whether an existing user profile with such preferences is available. If not, a new profile is created so as to begin building a unique understanding of the individual's preferences.

Additionally, the cognitive navigational algorithm determines whether a profile for the location and current exhibit display exists. If so, the profile is loaded and the user proceeds to visit exhibits as described above. If not, a new profile is created, and the algorithm prepares to learn about the user's specific preferences regarding this venue via a recommender function.

The recommender function is a machine learning algorithm configured to learn a user's preferences over time based on which of the recommended set of exhibits a user chooses to view, and a feedback mechanism specifying the user's satisfaction with a given exhibit after viewing. The recommender function, in one approach, is a supervised machine learning algorithm configured to adapt to user preferences regarding art exhibits over time based on the aforementioned choices and feedback.

Whether invoking the recommender function, or a previously generated profile, the cognitive navigational assistant directs a user through the exhibit space according to evolving recommendations and user choices until the specified time budget is exhausted.

Accordingly, in one approach a method and system provides recommendations about the prioritized order in which to visit a set of exhibits at a tourist attraction, taking into account personal preferences about exhibit types of interest, expected wait times at an exhibit, and the popularity of an exhibit based on aggregation and normalization from past history, subject to an indicated time budget, so as to maximize the number of exhibits that a viewer can visit in the specified time budget.

Expected wait times at a given exhibit may be determined by a plurality of factors, including but not limited to, crowd-sourced actual wait time as indicated by past visitors, time of day, day of the week, week of the month and month of the year, along with measured/approximated past wait times, lingering time of visitors at an exhibit, as captured by sensors such as Bluetooth Low Energy (BLE) beacons and Wi-Fi routers, etc.

The user profile indicating preferences may be specified as an initial input or start with a default profile, and adjusted over time based on a machine learning approach taking into account recommendation acceptance and rejection, as well as time spent at accepted recommendations and optionally number of times a given recommendation is selected/visited.

Preferably, especially where no user profile specifying user preferences is available, the set of exhibits recommended to the user is generated by a user-customizable flexible algorithm referenced herein as a "recommender function" that takes into account a number of scores, including, but not limited to: real-time estimated wait time at an exhibit, popularity of an exhibit based on past visitor history, and estimated walking distance/travel time from a given exhibit to the set of potential recommendable exhibits. These factors are preferably personalized to take the user's rate of walking into account, and a profile-directed, ranked list of potential exhibits generated on the basis thereof.

Figure 5:
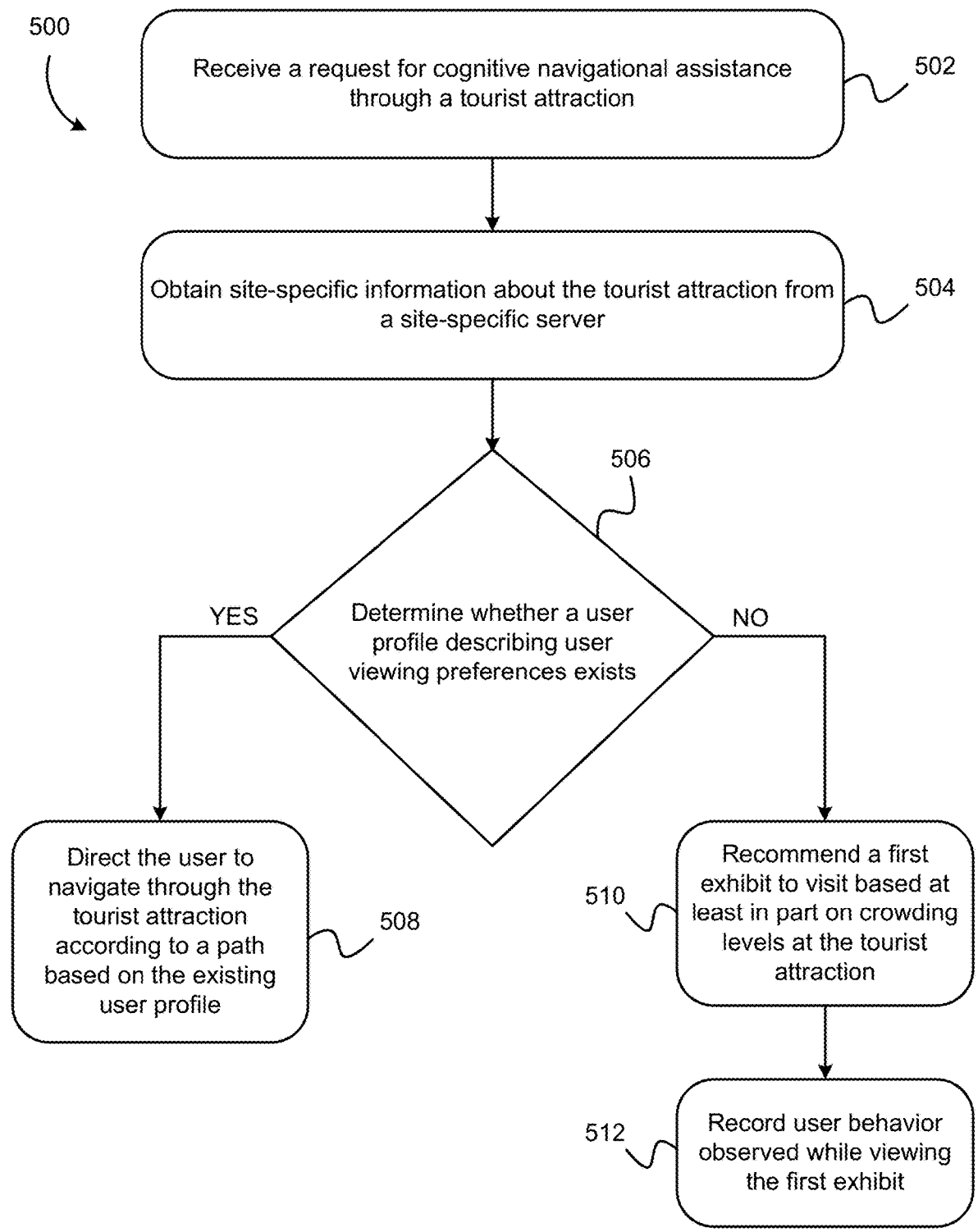
FIG. 5 is flowchart of a method for cognitive navigational guidance through a tourist attraction, in accordance with one embodiment.

Now referring to FIG. 5, a flowchart of a method 500 is shown according to one embodiment. The method 500 may be performed in accordance with the present invention in any of the environments depicted in FIGS. 1-2, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a server, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a request for cognitive navigational assistance through a tourist attraction is received. Preferably, the request is received via a mobile device that can in turn receive responses from a responding entity, e.g. a server hosting the tourist attraction or corresponding data services. Optionally, in response to receiving the request, a prompt may be sent to the requester seeking the museum or other site the requester wishes to visit, and the amount of time available for the visit. Also optionally, upon arrival at the site, the location of the user may be determined using any suitable locating or positioning technique.

In operation 504 of method 500, site-specific information about the tourist attraction, such as historical traffic patterns, ratings of various exhibits or the attraction as a whole, business hours, display schedules, etc. as would be understood by a person having ordinary skill in the art upon reading the present disclosure, is obtained. The site-specific information may be obtained by interfacing with a site-specific server, which may be hosted by the tourist attraction, a parent company of the tourist attraction, or some other third party.

Operation 506 involves a crucial determination for the ongoing progress of method 500. Specifically, in operation 506, it is determined whether a user profile describing viewing preferences of the user exists or is available to the system. If so, the profile is loaded and recommendations for viewing different exhibits and the path to navigate through the tourist attraction are provided. As such, in operation 508, the user is directed to navigate through the tourist attraction according to a path that was decided based on the existing user profile.

If, on the other hand, no existing user profile is available, a first exhibit recommendation is made based at least in part on crowding levels at the tourist attraction in operation 510. Naturally, the algorithm seeks to guide the user through a path with the least crowding, but over time other factors may come to dominate the path determination, as would be understood by a person having ordinary skill in the art upon reading the present descriptions. Notably, the crowding levels are determined based on querying location sensors deployed throughout the tourist attraction, preferably BLE beacons present at each exhibit.

In more embodiments, the first exhibit is recommended to the user further based on one or more criteria selected from the group consisting of: real-time estimated wait time at the first exhibit, popularity of the first exhibit based on past visitor history, estimated walking distance from an entrance of the tourist attraction to the first exhibit; and a user's personal walking speed.

In operation 512, user behavior observed while viewing the first exhibit is recorded. Preferably, the user behavior is recorded to a new user profile created in response to not locating any previously existing user profile in operation 506. The user behavior may include explicit feedback, e.g. user ratings, thumbs up/down designations, commentary, etc. as well as implicit feedback, e.g. number of times visited, average viewing time, etc. as described herein and as would be understood by a person having ordinary skill in the art upon reading the present disclosures. The user feedback may be weighted so as to form an overall impression of the user's opinion regarding various exhibits and make corresponding recommendations in the future.

The method 500 as shown in FIG. 5 has been described in accordance with one exemplary approach, but it shall be appreciated that in various embodiments the inventive concept represented by FIG. 5 and method 500 may include any number of additional and/or alternative features, especially including but not limited to those discussed above regarding FIGS. 3-4 for point-specific multilingual communication, and those discussed below regarding FIG. 6 and beacon-based vehicular communication.

For example, in one approach method 500 may include recommending a next exhibit to visit based at least in part on the crowding levels at the tourist attraction; recording user behavior while viewing the next exhibit; and repeating the recommending and the recording until a predetermined time budget is exhausted.

In preferred approaches, the path defined by the cognitive navigational assistant is dynamic. In other words, each step of the path represents a choice among a predetermined number of exhibits of the tourist attraction, and the path changes based on each choice made by the user. In one embodiment, at each step, the path provides the user three exhibits among which to choose as the next to visit. Upon receiving the user's choice, the algorithm reevaluates the physical space, crowding levels, and remaining exhibits, and calculates a new path with new recommendations.

Moreover, in preferred approaches and in response to the user choosing one of the exhibits at each step of the path, the method 500 includes loading commentary corresponding to the chosen one of the exhibits. Commentary may be loaded from a database maintained by the owner/operator of the tourist attraction, a third party, the government, or any other suitable entity, in various embodiments. Preferably, a dedicated application accesses a database to load commentary in a custom manner based on users' proximity to various exhibits.

Beacon-Based Vehicular Communication and Navigational Assistance

As noted above, while certain technologies already exist for summoning a vehicle to autonomously navigate to a location, these technologies are imprecise with respect to the actual location where the vehicle ultimately parks, and imprecisions of even a few feet can result in negative outcomes ranging from serious property damage and/or bodily harm to inconvenience (e.g. where the automobile is parked on the opposite side of a busy road, or where the road is separated by an impassible obstacle such as a fenced median, public transit route/track, or other physical barrier).

This imprecision is due in part to imprecision in determining the user's position upon summoning the vehicle, because most often the user summons the vehicle while indoors, where GPS triangulation does not allow precise location determination. Additionally, if a user exits from a different exit/entryway than the one taken upon entering the building, or uses a non-conventional (e.g. side, back instead of main) exit, the vehicle may have difficulty accurately identifying the destination location.

With the advent of Bluetooth Low Energy (BLE) beacon technology, location services can be provided with much greater accuracy, especially for indoor environments. In the context of summoning a vehicle to a desired location, by tracking the user's position via beacon technology and the user's mobile device, the vehicle can glean much more specific location data about the user and make any necessary adjustments to ensure arrival at the desired location is both spatially and timely accurate. In preferred approaches, vehicles will arrive at the desired location within an accuracy of approximately 10 inches when using beacon technology to determine the user's indoor location upon summoning.

Exemplary Embodiment 1

For example, in one embodiment beacon-based vehicular communication may involve a user downloading an application or subscribing to a service provided via the user's mobile device. For example, a vehicle manufacturer or navigational/roadside assistance provider may offer location services specifically for certain makes/models of vehicle, and provides a mobile application or interface to facilitate remote vehicular communication.

The user may invoke the application, and a tracking function, upon arrival at a given location. Alternatively, the mobile application may run in the background (as part of designated "location services" run/offered by the mobile device in a manner transparent to the user. In either event, upon initiation the mobile phone communicates with location sensors, preferably BLE beacons or equivalent technology, to monitor the user's position as they navigate through the (typically indoor, but in no way so limited) location. By tracking the user's position, the mobile application/service remains in a "ready" state to transmit accurate location information to a vehicle upon the user's initiation of communication with the vehicle, e.g. to summon the vehicle to a desired location.

To further improve accuracy, after summoning the vehicle the user's mobile device, via the mobile application software/service, will continue tracking the user's position to individual beacons, and may instruct the user to navigate to a beacon nearest the designated pickup location. Upon detecting signal from the user's mobile phone, the beacon will transmit a precise location to the cell phone, or the cell phone will perform a more accurate location determination (e.g. on a "micro-local" scale) and the accurate location will be transmitted to the vehicle. Upon receipt, the vehicle can navigate to the designated pick-up location within about 10 inches.

Exemplary Embodiment 2

In another exemplary embodiment, the user may own one or more beacons, one of which is attached to their vehicle and others of which may (optionally) be deployed at one or more locations.

The user is present at such a location, and the user's position is being tracked in real-time via the beacons deployed throughout that location, e.g. using a mobile service or dedicated mobile application, in alternative approaches. Upon exiting the location (e.g. a building on the premises, not necessarily the property boundary of the location), the user's coordinates are communicated in real-time to the beacon(s) attached to the user's vehicle, and the vehicle may, upon being summoned, navigate to the user's position with extreme accuracy, e.g. within 10 inches. While BLE beacons are generally limited in range to several meters, by activating the beacon from a sleep mode to an active mode, the range may be boosted to upwards of about 70 meters for alphanumeric commands.

Accordingly, the user location is tracked while navigating throughout the building using beacon(s) deployed at the location, and preferably upon exiting the building, the deployed beacon(s) activate the vehicle-bound beacon and provide alphanumeric commands binding the exact location of the user to the vehicle.

Upon receiving the alphanumeric command, the vehicle decodes the location information and activates autonomous navigation to the designated pickup location.

Moreover, based on user behavior patterns, user preferences, etc. which may be manually designated or learned over time, beacons may be activated/deactivated at certain times of day, days of week, locations, etc. in a predictive manner, providing additional convenience to the user. For instance, a daily pickup location and time in the morning and a second pickup location and time in the evening may be established based on regular work patterns/business hours and the vehicle may automatically engage in tracking/location sensing activities in time periods surrounding the typical pickup locations/times, e.g. from 8 am-10 am and 4 pm-6 pm.

Figure 6:
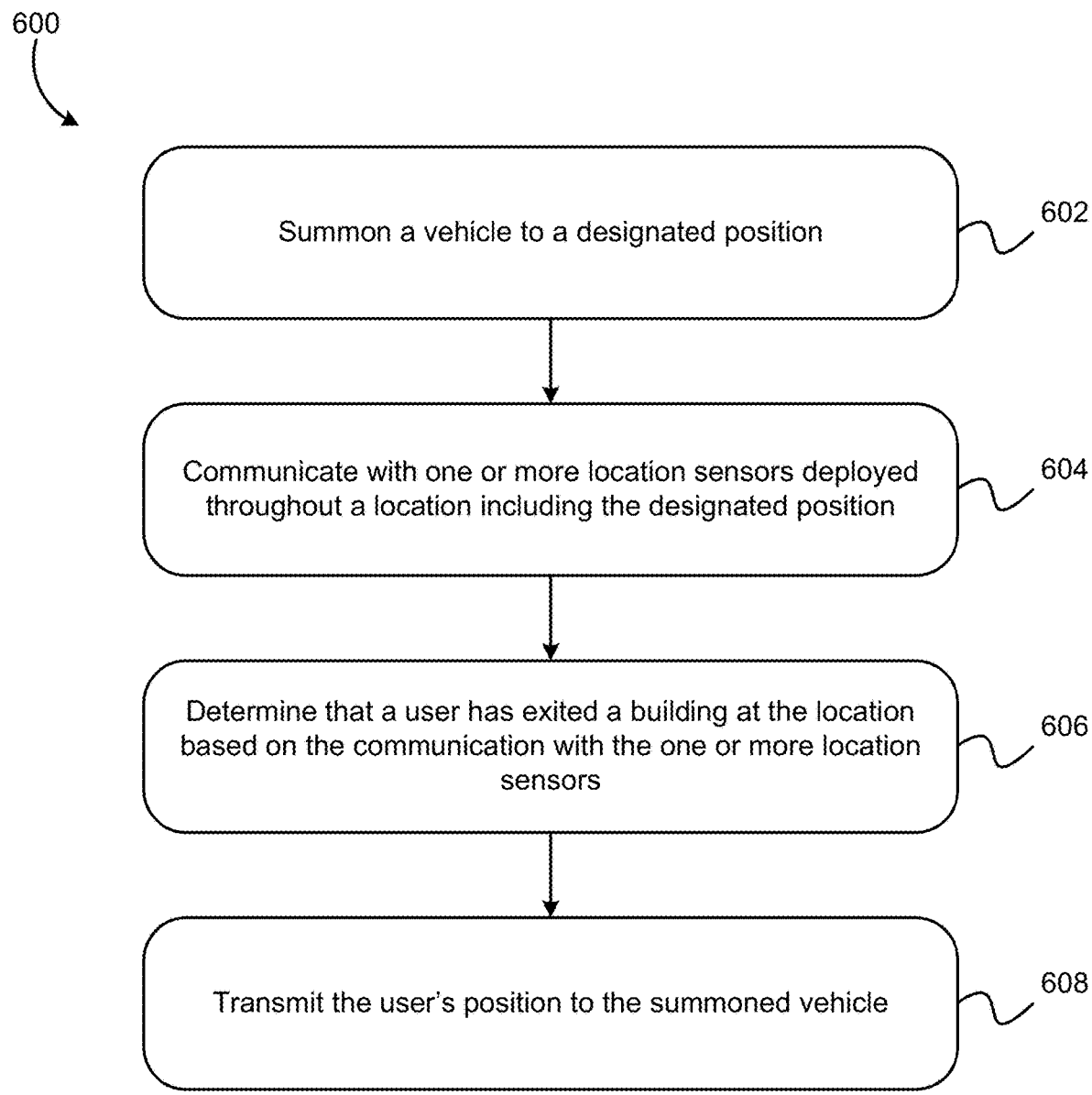
FIG. 6 is a flowchart of a method for beacon-based communication with a vehicle, in accordance with one embodiment.

Now referring to FIG. 6, a flowchart of a method 600 is shown according to one embodiment. The method 600 may be performed in accordance with the present invention in any of the environments depicted in FIGS. 1-3, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a server, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a vehicle is summoned to a designated position. The position may be absolute, e.g. a set of GPS coordinates, an address, etc. or relative, e.g. "my position," "near me," "near home," "close to work," etc. as would be understood by a skilled artisan upon reading the present disclosure. The summons may be provided as a request received as input provided by a user to the user's mobile device, as part of a mobile application or mobile service for summoning vehicles, etc. as such, the request may be received by the mobile device, via the mobile device, or from the mobile device, in various embodiments.

Operation 604, and optionally in response to the summons, involves communicating with one or more location sensors deployed throughout a location including the designated position, e.g. a mall, building, etc. where the "designated position" is outside.

In operation 606, method 600 includes determining the user has exited a building at the location. Preferably this determination is based on the communication(s) with the location sensor(s) indicating the user has traveled beyond the confines of the building or other interior space.

Method 600 also includes operation 608, where the user's position is transmitted to the summoned vehicle. Preferably, the user's position is transmitted after the user has exited the building so as to boost the accuracy of the location information provided to the vehicle. To this effect, in a particularly preferred embodiment, method 600 also includes instructing a user to navigate to a BLE beacons closest to the designated position upon detecting the user has exited the building, and transmitting the BLE beacon's location to the vehicle using the user's mobile device as a transmitter. In this manner, the vehicle is enabled to arrive at the user's position with an accuracy of 10 inches or less.

The method 600 as shown in FIG. 6 has been described in accordance with one exemplary approach, but it shall be appreciated that in various embodiments the inventive concept represented by FIG. 6 and method 600 may include any number of additional and/or alternative features, especially including but not limited to those discussed above regarding FIGS. 3-4 for point-specific multilingual communication, as well as regarding FIG. 5 and cognitive navigational assistance.

In one approach, the user's position may be transmitted to the vehicle as an encoded alphanumeric command.

In more approaches, the summons in operation 602 is sent automatically, e.g. in accordance with a user's defined schedule and/or user preferences specified with the application/service. Moreover, the user's schedule and/or preferences may be learned over time by observing user behavior, rather than user-defined, in other embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for cognitive navigational guidance through a tourist attraction, the method comprising:
   receiving a request for cognitive navigational assistance through a tourist attraction;
   obtaining site-specific information about the tourist attraction from a site-specific server;
   determining whether a user profile describing user viewing preferences exists, wherein the user profile comprises itinerary information and identifying information corresponding to a user; and
   either:
   directing the user to navigate through the tourist attraction according to a path based on the existing user profile; or
   recommending a first exhibit to visit based at least in part on crowding levels at the tourist attraction and recording user behavior observed while viewing the first exhibit.

2. The method as recited in claim 1, comprising:
   recommending a next exhibit to visit based at least in part on the crowding levels at the tourist attraction;
   recording user behavior while viewing the next exhibit; and
   repeating the recommending and the recording until a predetermined time budget is exhausted.

3. The method as recited in claim 1, wherein the path is dynamic;
   wherein each step of the path comprises a choice among three exhibits of the tourist attraction; wherein the path changes based on each choice made by the user; and
   wherein the method comprises loading, in response to the user choosing one of the three exhibits at each step of the path, commentary corresponding to the chosen one of the three exhibits.

4. The method as recited in claim 1, wherein the first exhibit is recommended to the user further based on one or more criteria selected from the group consisting of: a real-time estimated wait time at the first exhibit, a popularity of the first exhibit based on past visitor history, and an estimated walking distance from an entrance of the tourist attraction to the first exhibit.

5. The method as recited in claim 1, wherein the user behavior includes explicit feedback and implicit feedback.

6. The method as recited in claim 1, wherein the crowding levels are determined based on querying a plurality of Bluetooth low energy beacons deployed throughout the tourist attraction.

7. The method as recited in claim 1, comprising, in response to receiving the request, determining a location of the user upon the user arriving at the tourist attraction.

8. The method as recited in claim 1, comprising, in response to receiving the request, prompting the requester for a desired location and time budget associated with the request.

9. A computer program product for cognitive navigational guidance through a tourist attraction, the computer program product comprising a computer readable storage medium having program instructions embodied therewith, the program instructions readable and/or executable by a processor to cause the processor to:
   receive, at the processor, a request for cognitive navigational assistance through a tourist attraction;
   obtain, by the processor, site-specific information about the tourist attraction from a site-specific server;
   determine, by the processor, whether a user profile describing user viewing preferences exists, wherein the user profile comprises itinerary information and identifying information corresponding to a user; and
   either:
   direct, by the processor, the user to navigate through the tourist attraction according to a path based on the existing user profile; or
   recommend, by the processor, a first exhibit to visit based at least in part on crowding levels at the tourist attraction and record, by the processor, user behavior observed while viewing the first exhibit.

10. The computer program product as recited in claim 9, comprising program instructions readable and/or executable by the processor to cause the processor to:
    recommend, by the processor, a next exhibit to visit based at least in part on the crowding levels at the tourist attraction;
    record, by the processor, user behavior while viewing the next exhibit; and
    repeat, by the processor, the recommending and the recording until a predetermined time budget is exhausted.

11. The computer program product as recited in claim 9, wherein the path is dynamic;
    wherein each step of the path comprises a choice among three exhibits of the tourist attraction;
    wherein the path changes based on each choice made by the user; and
    wherein the computer readable storage medium comprises program instructions readable and/or executable by the processor to cause the processor to load, in response to the user choosing one of the three exhibits at each step of the path, commentary corresponding to the chosen one of the three exhibits.

12. The computer program product as recited in claim 9, wherein the first exhibit is recommended to the user further based on one or more criteria selected from the group consisting of: a real-time estimated wait time at the first exhibit, a popularity of the first exhibit based on past visitor history, and an estimated walking distance from an entrance of the tourist attraction to the first exhibit.

13. The computer program product as recited in claim 9, wherein the user behavior includes explicit feedback and implicit feedback.

14. The computer program product as recited in claim 9, wherein the crowding levels are determined based on querying a plurality of Bluetooth low energy beacons deployed throughout the tourist attraction.

15. The computer program product as recited in claim 9, comprising program instructions readable and/or executable by the processor to cause the processor to determine, in response to receiving the request, a location of the user upon the user arriving at the tourist attraction.

16. The computer program product as recited in claim 9, comprising program instructions readable and/or executable by the processor to cause the processor to prompt, in response to receiving the request, the requester for a desired location and time budget associated with the request.

17. A system, comprising:
    a processor; and
    logic integrated with the processor, executable by the processor, or integrated with and executable by the processor, the logic being configured to:

receive a request for cognitive navigational assistance through a tourist attraction;

obtain site-specific information about the tourist attraction from a site-specific server, wherein the site-specific information comprises and/or is derived from audio collected from an environment hosting the tourist attraction;

determine whether a user profile describing user viewing preferences exists; and either:
- direct the user to navigate through the tourist attraction according to a path based on the existing user profile; or
- recommend a first exhibit to visit based at least in part on crowding levels at the tourist attraction and record user behavior observed while viewing the first exhibit.

18. The system as recited in claim 17, wherein the logic is configured to determine whether the site-specific information is relevant to the user, and/or whether the site-specific information includes information relevant to the user.

19. The system as recited in claim 17, wherein determining whether the site-specific information is relevant to the user, and/or whether the site-specific information includes information relevant to the user comprises determining whether the site-specific information is relevant to:

- a current location of the user;
- an ultimate destination of the user; and/or
- a time of importance to the user.

20. The system as recited in claim 17, further comprising determining, based at least in part on the user profile, whether any of the site-specific information requires translation; and in response to determining some or all of the site-specific information requires translation:
- translating the some or all of the site-specific information; and
- communicating at least a portion of the translated site-specific information to the user via a mobile device.

* * * * *